UNITED STATES PATENT OFFICE.

ROBERT E. WILSON, OF WASHINGTON, DISTRICT OF COLUMBIA, AND CLAUDE P. McNEIL, OF ASTORIA, NEW YORK.

SODA-LIME COMPOSITION AND METHOD OF PREPARING THE SAME.

1,335,949.     Specification of Letters Patent.     Patented Apr. 6, 1920.

No Drawing.     Application filed October 2, 1918. Serial No. 256,538.

(FILED UNDER THE ACT OF MARCH 3, 1883, 22 STAT. L., 625.)

*To all whom it may concern:*

Be it known that we, ROBERT E. WILSON and CLAUDE P. MCNEIL, citizens of the United States, stationed at Washington, in the District of Columbia, and Astoria, Long Island, New York, respectively, have invented new and useful Improvements in Soda-Lime Compositions and Methods of Preparing the Same, of which the following is a specification.

This application is made under the act of March 3, 1883, chapter 143, (22 Stat. 625), and the invention herein described and claimed may be used by the Government of the United States or any of its officers or employees in the prosecution of the work for the Government, or any person in the United States, without payment to us of any royalty thereon.

This invention relates to compositions for the absorption of gases, especially of gaseous or vaporous impurities in the air or in other well known gases, natural or artificial. More specifically our invention relates to compositions of the soda-lime type and we contemplate the production of a composition which shall be non-deliquescent, harder and more efficient, and have a longer life than compositions hitherto used.

In order to carry the objects of our invention into effect we provide an improved composition and a method of preparing the same. Our improvements in compositions of the soda-lime type consist in using a relatively slow setting cement, and a permanganate substantially free from salts of the oxygen acids of chlorin and producing a uniform moisture content in the finished product. By an improved method of mixing the ingredients and drying the composition we have been enabled to produce a uniformly active product. Each of the above improvements constitutes a distinct advance in the art and our invention includes such improvements individually and collectively.

The compositions hitherto employed comprised an alkali as caustic soda, lime, an earth as kieselguhr, a cement, and a permanganate, usually the sodium salt containing a considerable percentage of sodium hypochlorite, sodium chlorate or other salts of the oxygen acids of chlorin. A small amount of moisture was also present in the mixture employed. Compositions containing such ingredients are used to purify the atmosphere by absorption of poisonous or deleterious gases and the proportions of materials may be, varied to suit the characteristics of the gas or gases the need of whose absorption is anticipated.

In the soda lime compositions heretofore produced the sodium permanganate used has contained as much as 18% of sodium chlorate. We have discovered, however, that not only is the presence of this sodium chlorate not useful but that it is actually harmful and that the efficient life of the composition when a chlorate-free permanganate is used may be increased by 20% or more. This chlorate is usually formed in the oxidation of the sodium manganate to permanganate by chlorin in an alkaline solution. Its formation may, however, be prevented by the addition of cobalt hydroxid, which catalyzes the oxidation of the sodium manganate to permanganate without the formation of chlorates. It is obvious that a pure permanganate formed in any other manner may be used.

It has been common in the processes of making soda lime heretofore used, to employ a quick setting cement, that is, one which will set in a few minutes. We have found, however, that the employment of a slow setting cement, i. e., one which will not set within a half hour is preferable not only in that it permits of a more easy manipulation but that it also produces a composition which is much harder than that produced by the quick setting cement.

Instead of the ordinary procedure of mixing the materials in small batches and slabbing very quickly as is necessary with a quick setting cement, we mix the cement with the materials in a mixer, then mix with water and slab at any time within a half hour. We have found that by using purer permanganate, slow setting cement, larger batches and a longer time of mixing that the amount of water necessary to be added may be materially reduced and a harder product thereby obtained.

The material is slabbed by placing it in layers about an inch thick in trays made of galvanized iron wire and then dried. These trays are rapidly corroded by chlorid, hypochlorite and chlorate. We have found that when pure permanganate free from chlorate is used this corrosion may be avoided.

It was previously considered necessary to leave a border space around the slabs on the tray in order to facilitate removal of the slab after drying. This is not necessary and we have found that a more evenly dried product is obtained when this space is omitted and the trays filled completely since the drying air passes over the material evenly and not in greater amount near the edges as is the case in the usual drying arrangement.

At the beginning of the drying a temperature of about 90° C. is maintained and as the drying nears completion the temperature is reduced reaching about 70° C. as the moisture content gets below 15%. This reduction in temperature is necessary toward the end of the drying process since higher temperatures have a tendency to cause a reduction of the permanganate.

When thoroughly dried, the material is ground to between 8 and 14 mesh. This is done by gradual reduction by a series of four rolls preceded by a rotary crusher. The product is easily crushed owing to the absence of the deliquescent chlorate salts and because of the increased hardness of the product.

We do not intend to limit ourselves to the exact procedure above set forth nor to improvements in soda-lime mixtures, but we consider our invention adapted to other compositions of similar character used for the absorption of gases.

We claim:

1. In a composition of the soda-lime type for the absorption of gases, a relatively slow setting cement.

2. In a composition of the soda-lime type for the absorption of gases, a cement which will not set within a half hour after mixing with water.

3. In a composition of the soda-lime type for the absorption of gases, a permanganate substantially free from salts of the oxygen acids of chlorin.

4. A composition of the soda-lime type composed of caustic soda, lime, kieselguhr, sodium permanganate free from salts of the oxygen acids of chlorin, a cement which will not set in less than half an hour after mixing with water, and having substantially uniform moisture content.

5. In a method of treating a composition of the soda-lime type, the step which consists in completely filling trays of reticulated material with the mixture and passing drying gases uniformly over the mass.

6. In a method of drying a composition of the soda-lime type, the step which consists in first passing the drying gases through the mixture at a relatively high temperature and then allowing the temperature to drop materially toward the end of the drying operation to prevent decomposition.

7. In a method of drying a composition of the soda-lime type, the steps which consist in first passing the drying gases at a temperature approximately 90° C. through the mixture, and then allowing the temperature to drop to approximately 70° C. when the moisture content falls below 15%.

ROBERT E. WILSON.
C. P. McNEIL.